US009607555B2

(12) United States Patent
Kimura

(10) Patent No.: US 9,607,555 B2
(45) Date of Patent: Mar. 28, 2017

(54) DISPLAY APPARATUS AND CONTROL METHOD THEREOF

(71) Applicant: CANON KABUSHIKI KAISHA, Tokyo (JP)

(72) Inventor: Takushi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 14/628,549

(22) Filed: Feb. 23, 2015

(65) Prior Publication Data

US 2015/0243228 A1 Aug. 27, 2015

(30) Foreign Application Priority Data

Feb. 25, 2014 (JP) ................................ 2014-034213
Jan. 6, 2015 (JP) ................................ 2015-000654

(51) Int. Cl.

*G09G 3/34* (2006.01)
*G09G 3/36* (2006.01)
*G09G 5/02* (2006.01)
*G06T 11/00* (2006.01)
*G06T 5/00* (2006.01)
*H04N 1/46* (2006.01)
*H04N 5/57* (2006.01)
*H04N 1/60* (2006.01)
*H04N 9/69* (2006.01)

(52) U.S. Cl.

CPC ......... *G09G 3/3413* (2013.01); *G09G 3/3611* (2013.01); *G09G 2320/0646* (2013.01); *G09G 2320/0666* (2013.01); *G09G 2360/16* (2013.01)

(58) Field of Classification Search

CPC combination set(s) only.
See application file for complete search history.

(56) References Cited

U.S. PATENT DOCUMENTS

2007/0052636 A1* 3/2007 Kalt ......................... G09G 3/34 345/83
2008/0259369 A1* 10/2008 Kanai ................... G06T 11/001 358/1.9
2013/0093783 A1* 4/2013 Sullivan ................... G09G 5/06 345/601

FOREIGN PATENT DOCUMENTS

CN 101635132 A 1/2010
CN 101676983 A 3/2010
CN 102298908 A 12/2011

(Continued)

OTHER PUBLICATIONS

The Oct. 22, 2015 Japanese Office Action, that issued in Japanese Patent Application No. 2015000654.

(Continued)

*Primary Examiner* — Wesner Sajous
(74) *Attorney, Agent, or Firm* — Cowan, Liebowitz & Latman, P.C.

(57) ABSTRACT

A display apparatus includes: a light-emitting unit that includes a plurality of light-emitting devices; a display unit; a first determination unit configured to determine, in a region, whether a ratio of a total number of first type pixels is a first ratio or more; a second determination unit configured to determine, in the region, whether a ratio of a total number of second type pixels is a second ratio or more, when the determination result of the first determination unit is affirmative; and a control unit configured to increase emission brightness of a target device based on the determination result of the second determination unit.

17 Claims, 10 Drawing Sheets

(56) References Cited

FOREIGN PATENT DOCUMENTS

| | | | |
|---|---|---|---|
| CN | 102844788 | A | 12/2012 |
| JP | 2005-215353 | A | 8/2005 |
| JP | 2007-322944 | A | 12/2007 |
| JP | 2009-053687 | A | 3/2009 |
| JP | 2009-198595 | A | 9/2009 |
| JP | 2013-033088 | A | 2/2013 |
| JP | 2013-134458 | A | 7/2013 |
| JP | 2013-167870 | A | 8/2013 |
| WO | 2012/137753 | A1 | 10/2012 |
| WO | 2013/160695 | A1 | 10/2013 |

OTHER PUBLICATIONS

The above foreign patent documents were cited in the Dec. 12, 2016 Chinese Office Action, which is enclosed with an English Translation, that issued in Chinese Patent Application No. 201510087366.1.

* cited by examiner

*FIG. 11*

| | (a) | (b) | (c) |
|---|---|---|---|
| IMAGE | 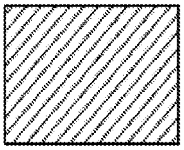 BLUE SINGLE COLOR | 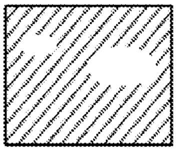 BLUE SKY AND WHITE CLOUDS | 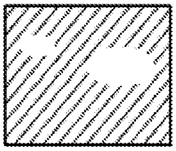 BLUE SKY AND WHITE CLOUDS |
| EMISSION BRIGHTNESS OF BACKLIGHT (R:G:B) | 0.1 : 0.1 : 1<br>LIGHT OF R DEVICE AND G DEVICE REDUCED | 1 : 1 : 1<br>LIGHT OF R DEVICE AND G DEVICE NOT REDUCED SINCE WHITE EXISTS | 1 : 1 : 4<br>EMISSION BRIGHTNESS OF B DEVICE INCREASED (B DEVICE IS BOOSTED) |
| EMISSION COLOR OF BACKLIGHT | 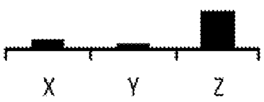  | 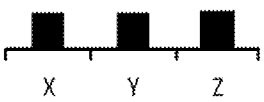  | 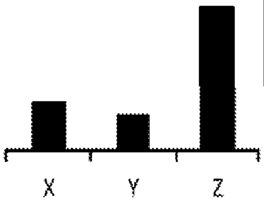  |
| CORRECTION RATE OF IMAGE (R:G:B) | 10 : 10 : 1 | 1 : 1 : 1 | 1 : 1 : 0.25 |
| DISPLAY COLOR OF BLUE | 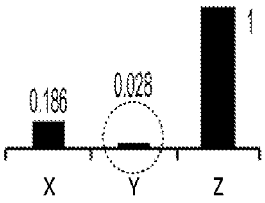  Y IS LOW (1) | 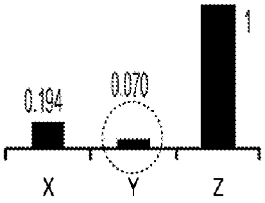  Y IS HIGH (2.2) |   Y IS LOW (1.2) |
| COLOR GAMUT EXPANSION EFFECT | CHROMA OF BLUE IMPROVES | NONE | CHROMA OF BLUE IMPROVES |

DISPLAY APPARATUS AND CONTROL METHOD THEREOF

BACKGROUND OF THE INVENTION

Field of the Invention

The present invention relates to a display apparatus and a control method thereof.

Description of the Related Art

As a technique related to a liquid crystal display apparatus, a technique to control emission brightness (light emission amount) of a backlight based on input image data is available. If this technique is used, contrast of a display image (image displayed on the screen) can be increased, and power consumption of the display apparatus can be reduced. If the emission brightness of a plurality of light sources constituting the backlight is individually controlled, or if input image data is corrected according to the emission brightness of the backlight, then contrast of the display image can be further improved.

Furthermore, if three light-emitting devices, that is, an R device that emits red light, a G device that emits green light and a B device that emits blue light, are used as the light source of the backlight, the emission color of the light source can be controlled by individually controlling the emission brightness (light emission amount) of the three light-emitting devices. Then the color gamut of the display image can be expanded by controlling the emission color of the light source based on the input image data.

The technique to control the emission color of the light source is disclosed, for example, in Japanese Patent Application Laid-open No. 2009-53687 and in Japanese Patent Application Laid-open No. 2007-322944.

Using the technique disclosed in Japanese Patent Application Laid-open No. 2009-53687, one of the three emission colors of the three light-emitting devices is detected as a dominant color component of the input image data. Then the emission brightness of the light-emitting device having the detected emission color is maximized (emission brightness of the light-emitting devices having emission color other than the detected emission color is decreased), whereby the color parity of the dominant color component of the input image data is enhanced.

In the case of the technique disclosed in Japanese Patent Application Laid-open No. 2007-322944, the emission color of the light source is controlled such that the color with chromaticity that is close to the chromaticity of the input image data is emitted from the light source, whereby the color gamut of the display image is expanded.

SUMMARY OF THE INVENTION

According to the above mentioned prior arts, a high color gamut expansion effect (effect to expand the color gamut of the display image) can be implemented if the input image data is single color image data. However the high color gamut expansion effect may not be implemented if a plurality of colors is included in the input image data.

The present invention to provide a technique that allows expanding the color gamut of a display image with high precision.

The present invention in its first aspect provides a display apparatus, comprising:

a light-emitting unit that includes a plurality of light-emitting devices of which emission colors are different from one another;

a display unit configured to display an image on a screen by modulating light from the light-emitting unit based on image data;

a first determination unit configured to determine, in a region of the screen that corresponds to the light-emitting unit, whether a ratio of a total number of first type pixels of which chroma level is less than a first chroma level, with respect to a total number of pixels in the region, is a first ratio or more;

a second determination unit configured to determine, in the region, whether a ratio of a total number of second type pixels of which chroma level is a second chroma level or more, with respect to the total number of pixels in the region, is a second ratio or more, when the determination result of the first determination unit is affirmative; and a control unit configured to increase emission brightness of a target device, which is at least one of the plurality of light-emitting devices, based on the determination result of the second determination unit.

The present invention in its second aspect provides a method for controlling a display apparatus which has:

a light-emitting unit that includes a plurality of light-emitting devices of which emission colors are different from one another; and a display unit configured to display an image on a screen by modulating light from the light-emitting unit based on image data, the method comprising:

a first determination step of determining, in a region of the screen that corresponds to the light-emitting unit, whether a ratio of a total number of first type pixels of which chroma level is less than a first chroma level, with respect to a total number of pixels in the region, is a first ratio or more;

a second determination step of determining, in the region, whether a ratio of a total number of second type pixels of which chroma level is a second chroma level or more, with respect to the total number of pixels in the region, is a second ratio or more, when the determination result in the first determination step is affirmative; and a control step of increasing emission brightness of a target device, which is at least one of the plurality of light-emitting devices based on the determination result in the second determination step.

The present invention in its third aspect provides a program that causes a computer to execute each step of the method for controlling the display apparatus.

According to the present invention, the color gamut of the display image can be expanded with high precision.

Further features of the present invention will become apparent from the following de script ion of exemplary embodiments with reference to the attached drawings.

BRIEF DESCRIPTION OF THE DRAWINGS

FIG. 11 is a diagram depicting an example of a color gamut expansion effect.

DESCRIPTION OF THE EMBODIMENTS

Example 1

A display apparatus and a control method thereof according to Example 1 of the present invention will now be described.

In the description below, the display apparatus according to this example is a transmission type liquid crystal display apparatus, but the display apparatus according to this example is not limited to this. The display apparatus according to this example can be any display apparatus that displays an image on the screen by modulating light from a light source apparatus. For example, the display apparatus according to this example may be a reflection type liquid crystal display apparatus. The display apparatus according to this example may be a Micro Electro Mechanical System (MEMS) shutter type display apparatus which uses an MEMS shutter, instead of liquid crystal devices.

Figure 1:
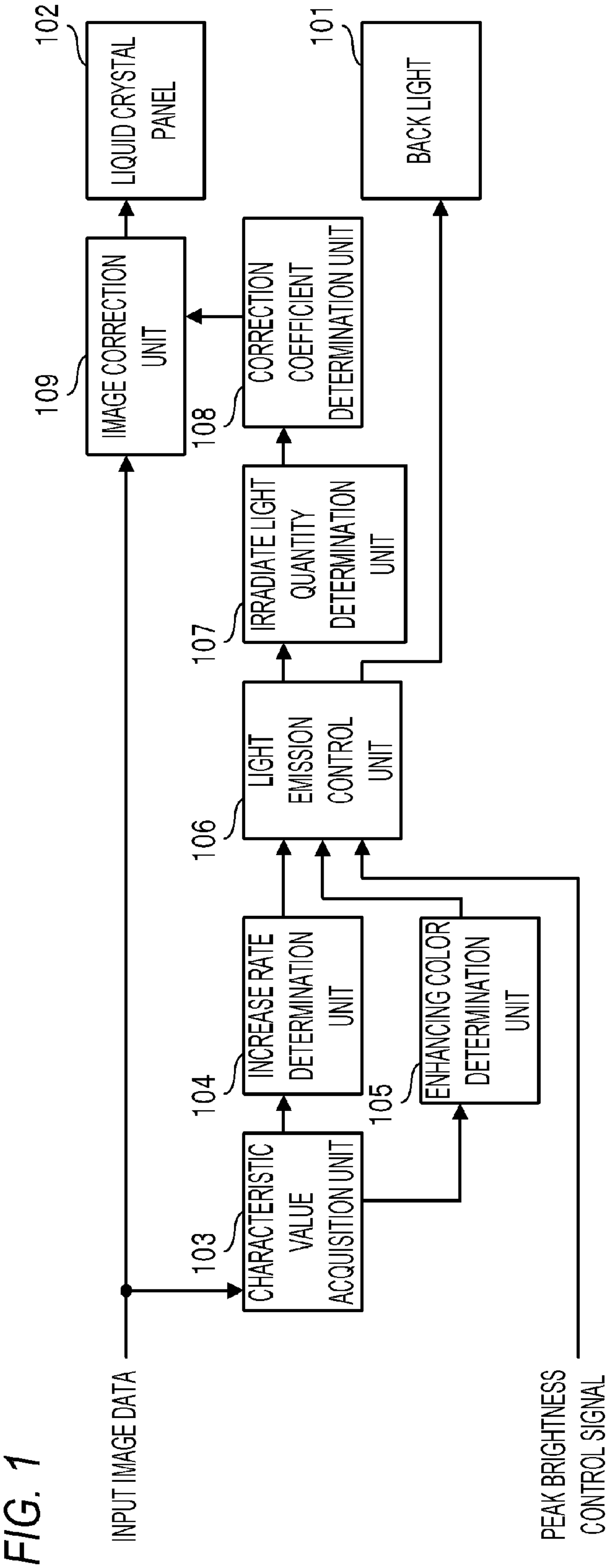
FIG. 1 is a block diagram depicting an example of a functional configuration of a display apparatus according to Example 1.

FIG. 1 is a block diagram depicting an example of a functional configuration of the display apparatus according to Example 1.

The display apparatus according to this example includes a backlight 101, a liquid crystal panel 102, a characteristic value acquisition unit 103, an increase rate determination unit 104, an enhancing color determination unit 105, alight emission control unit 106, an irradiated light quantity determination unit 107, a correction coefficient determination unit 108, and an image correction unit 109.

The backlight 101 is a light-emitting unit including a plurality of light-emitting devices of which emission colors are different from one another. The light emitted from the backlight 101 is irradiated onto the rear face of the liquid crystal panel 102. In this example, the backlight 101 has a plurality of light sources each of which has the plurality of light-emitting devices. In concrete terms, the light source is disposed in each of the plurality of light-emitting regions constituting the light-emitting surface of the backlight 101. For example, the backlight 101 has m×n (m and n are 1 or greater integers) number of light sources which correspond to the m (horizontal direction)×n (vertical direction) of the light-emitting regions. The emission brightness of the plurality of light-emitting devices can be individually controlled. In concrete terms, the light-emitting devices emit light at emission brightness according to the emission control value, and the emission control values of the plurality of light-emitting devices can be individually controlled. Further, in this example, the light source has three light-emitting devices: an R device that emits red light; a G device that emits green light; and a B device that emits blue light.

The light-emitting device is not limited to the R device, the G device or the B device. For example, a light-emitting device that emits yellow light may be used.

The liquid crystal panel 102 is a display unit (display panel) that displays an image on the screen by transmitting the light from the backlight 101 with transmittance based on the image data inputted to the liquid crystal panel 102. In this example, a case when a pixel of the input image data is constituted by three sub-pixels: an R sub-pixel which is a red sub-pixel; a G sub-pixel which is a green sub-pixel; and a B sub-pixel which is a blue sub-pixel, will be described. The input image data has a sub-pixel value, which is a 12-bit (0 to 4095) value, for each sub-pixel. Hereafter, a value of an R sub-pixel is referred to as an “R value”, a value of a G sub-pixel as a “G value”, and a value of a B sub-pixel value as a “B value”.

The sub-pixel value is not limited to a 12-bit value. The number of bits of a sub-pixel value may be greater than or lesser than 12 bits.

From input image data, the characteristic value acquisition unit 103 acquires a characteristic value which indicates the brightness of the input image data. In concrete terms, the characteristic value of the image data that should be displayed in a region (correspondence region) of the screen corresponding to each light source is acquired from the input image data for the light source. In this example, a plurality of light sources corresponds to a plurality of correspondence regions constituting a region of a screen. Then for each correspondence region, the characteristic value of the image data should be displayed in the correspondence region is acquired from the input image data. In this example, the characteristic value that indicates the brightness of the color corresponding to the emission color of the light-emitting device is acquired for each light-emitting device. In concrete terms, the maximum value of the R value, the maximum value of the G value and the maximum value of the B value in the correspondence region are acquired as the characteristic value.

The characteristic value acquisition unit 103 outputs the acquired characteristic value to the increase rate determination unit 104.

The characteristic value is not limited to the maximum value of the R value, the maximum value of the G value and the maximum value of the B value. For example, the characteristic value may be a histogram of pixel values, a histogram of brightness values, a representative value of pixel values, or a representative value of brightness values. The representative value is, for example, a maximum value, a minimum value, a mean value, a mode or a median.

The characteristic value acquisition unit 103 detects non-correspondence pixels (first type pixels) and correspondence pixels (second type pixels) from the pixels of the input image data. A non-correspondence pixel is a pixel of which difference between the emission color of the light-emitting device and the color of the pixel is greater than a first threshold in each of the plurality of light-emitting devices of the backlight 101. The corresponding pixel is a pixel of which difference between the emission color of the light-emitting device and the color of the pixel is a second threshold or less in any of the plurality of light-emitting devices of the backlight 101. In concrete terms, a non-correspondence pixel and a correspondence pixel are detected for each light source out of the pixels that should be displayed in the correspondence region corresponding to the light source.

In this example, a pixel of which chroma level is less than the threshold C1 (less than the first chroma level) is determined as a pixel with low chroma and as a non-correspondence pixel. A pixel of which chroma level is the threshold C1 or more and less than a threshold C2 is determined as a pixel with intermediate chroma. A pixel of which chroma level is the threshold C2 or more (second chroma level or more) is determined as a pixel with high chroma and as a correspondence pixel. Here $0 < \text{threshold C1} \le \text{threshold C2} \le 1$. If the chroma level of pure white is 0, and the chroma level of pure red/pure green/pure blue is 1, 0.3 is set for the threshold C1, and 0.7 is set for the threshold C2, for example. A pixel with high chroma can be regarded as a pixel of which color purity with respect to the emission color of the light-emitting device is the threshold C2 or more. A pixel with low chroma can be regarded as a pixel of which color purity with respect to the emission color of the light-emitting device is less than the threshold C1.

The first threshold, the second threshold, the threshold C1 and the threshold C2 can be any value. These thresholds may be fixed values determined by the manufacturer in advance, or may be values that the user can freely set or change. The second threshold may be the same value as the first threshold, or may be a different value from the first threshold.

The chroma according to the present invention indicates the degree of saturation of the color, and is not limited to the chroma as one element constituting a specific color space, such as the HSV color space (color space constituted by hue, saturation (chroma) and value (lightness)).

A method of detecting the correspondence pixel will be described in concrete terms.

In this example, a pixel of which difference between the emission color of the light-emitting device and the color of the pixel is the second threshold or less is detected as the correspondence pixel for each light-emitting device. In concrete terms, a correspondence pixel of which difference between red and the color of the pixel is the second threshold or less is detected as an R single color pixel. For example, a pixel of which R value is high and G value and B value are low is detected as the R single color pixel. In concrete terms, a pixel of which R value is the threshold value D or more and G value and B value are the threshold E or less (threshold E threshold D) is detected as the R single color pixel. If the upper limit value of the R value is 1, 0.7 is set as the threshold D, 0.3 is set as the threshold E, for example.

In the same manner, a correspondence pixel of which difference between green and the color of the pixel is the second threshold or less is detected as a G single color pixel, and a correspondence pixel of which difference between blue and the color of the pixel is the second threshold or less is detected as a B single color pixel.

The thresholds D and E can be any value. These thresholds may be fixed values determined by the manufacturer in advance, or may be values that the user can freely set or change.

The characteristic value acquisition unit 103 outputs the detection result of each light source to the enhancing color determination unit 105. In this example, a total number of non-correspondence pixels, a total number of R single color pixels, a total number of G single color pixels and a total number of B single color pixels detected for a light source are outputted as the detection results on the light source.

The method for detecting the correspondence pixels (single color pixels) is not limited to the above mentioned method. For example, a pixel having chromaticity, of which difference from the chromaticity of red is a threshold or less, may be detected as the R single color pixel.

In this example, an example when the correspondence region is the same region as the light-emitting region is described, but the correspondence region may be different from the light-emitting region. The region of the screen may not be constituted by a plurality of correspondence regions. The correspondence region may be larger or smaller than the light-emitting region. The correspondence region may overlap with another correspondence region. For the plurality of correspondence regions, a plurality of regions which do not contact with one another may be used. One correspondence region may correspond with two or more light sources.

Acquisition of the characteristic value and detection of the correspondence pixels may be performed by mutually different functional units. For example, the display apparatus may include an acquisition unit that acquires the feature value, and a detection unit that detect the correspondence pixel.

The increase rate determination unit 104 determines the increase rate of the emission brightness of the light-emitting device based on the input image data. In this example, the increase rate of the emission brightness of each of the plurality of light-emitting devices constituting each light source is determined for the light source based on the characteristic value acquired by the characteristic value acquisition unit 103. In concrete terms, the increase rate of each light source is determined for the light source based on the plurality of characteristic values acquired for the plurality of light-emitting devices of the light source. The increase rate here is a ratio of the emission brightness with respect to a predetermined reference value. The predetermined reference value is emission brightness when control of the emission brightness using the input image data is not performed. In this example, the emission brightness of each light-emitting device is controlled so that the emission brightness of the backlight 101 becomes higher in the case when the brightness of the image data is high compared with the case when the brightness of the image data is low. Therefore the increase rate determination unit 104 determines an increase rate for the light source that is higher as the brightness indicated by the characteristic value is higher.

An example of a method for determining the increase rate will be described.

To display all the pixels within the correspondence region at a brightness corresponding to the pixel values, the emission brightness of each correspondence region is set such that the image is displayed at a brightness corresponding to the maximum value of the pixel value in the correspondence region. In other words, the increase rate is determined to be a value greater than the ratio of the maximum value of the sub-pixel values (sub-pixel maximum value) with respect to the maximum value of a value that the sub-pixel value could have (e.g. 4095 if the sub-pixel value is a 12-bit value). In this example, the increase rate of the light source is determined for each light source based on the maximum value of a plurality of sub-pixel maximum values and the maximum value that the sub-pixel value could have.

The method for determining the increase rate is not limited to this method. For example, the emission brightness of each light-emitting device may be controlled such that the emission brightness of the backlight 101 is higher in the case when the brightness of the image data is low, compared with the case when the brightness of the image data is high. To perform such control, the higher increase rate is determined as the brightness indicated by the characteristic value is lower. Instead of determining a common increase rate for the R device, G device and B device, an increase rate may be determined for each light-emitting device. In concrete terms, the increase rate of the light-emitting device may be determined for each light-emitting device based on the sub-pixel maximum value corresponding to the emission color of the light-emitting device.

The enhancing color determination unit 105 determines the enhancing color based on the detection result of the non-correspondence pixels and the correspondence pixels by the characteristic value acquisition unit 103. In this example, the enhancing color is determined for each light source. In concrete terms, the enhancing color determination unit 105 executes a first determination process and a second determination process. The first determination process is a process to determine, for each light source, whether the ratio of the total number of non-correspondence pixels that should be displayed in the correspondence region corresponding to the light source, with respect to the total number of pixels of the image data in this correspondence region, is a first ratio or more. The second determination process is executed when the determination result of the first determination process is affirmative. The second determination process is a process for determining, for each light-emitting device of a light source for which the determination result of the first determination process is affirmative, whether a total number of correspondence pixels which should be displayed in the correspondence region corresponding to the light source having the light-emitting device, and of which difference between the emission color of the light-emitting device and the color of the pixel is the second threshold or less, with respect to the total number of pixels of the image data in the correspondence region corresponding to the light source having this light-emitting device, is a second ratio or more. The emission color of the light-emitting device for which the determination result of the second determination process is affirmative is determined as the enhancing color. In other words, the enhancing color is not determined if the determination result of the first determination process is negative and if there is no light-emitting device of which result of the second determination process is affirmative. The enhancing color can be regarded as a color component, of which color gamut is supposed to be expanded (expanding direction), of the display image (image display and on the screen).

The enhancing color determination unit 105 outputs the enhancing color for each light source to the light emission control unit 106.

The light emission control unit 106 increases the emission brightness of the light-emitting device (target device) that emits the light of the enhancing color determined by the enhancing color determination unit 105. In concrete terms, the emission brightness of a light-emitting device is controlled such that the light-emitting device emits light at higher emission brightness as the number of correspondence pixels detected for the light-emitting device that emits the light of the enhancing color is greater. In this example, the light emission of each light source is controlled based on the determination result of the second determination process. In concrete terms, each light source (each correspondence region) is controlled such that the emission brightness of the light-emitting device that emits the light of the enhancing color determined for this light source becomes higher as the number of correspondence pixels detected for this light-emitting device is greater.

Here the emission brightness is controlled based on the number of correspondence pixels because the saturation of the color can be visually sensed more easily in an image region where pixels having high chroma are distributed over a wide area. As mentioned above, the color of the light from the backlight 101 can be accurately changed to a color in which the saturation of color can be more easily sensed by controlling the emission brightness. As a result, the color purity of the color, of which saturation can be visually sensed more easily, can be further enhanced as this visual sense of the saturation is more pronounced.

Figure 2:
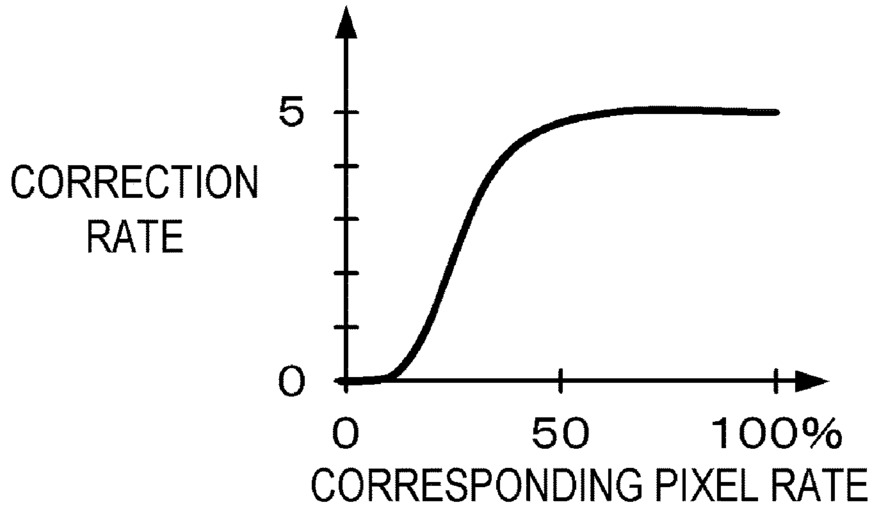
FIG. 2 is a graph depicting an example of the correspondence between a corresponding pixel ratio and a correction rate according to Example 1.

In this example, the light emission control unit 106 corrects so that the increase rate of light-emitting devices, that emit the light of enhancing color, becomes higher as the number of correspondence pixels detected for the light-emitting device is greater. In concrete terms, the increase rate is corrected with the correction rate that is in accordance with the correspondence pixel ratio, which is a ratio of the total number of correspondence pixels, which are displayed in the correspondence region, and have a color corresponding to the enhancing color (color of which difference from the enhancing color is the second threshold or less), with respect to the total number of pixels displayed in this correspondence region. For example, the correction rate is determined using information that indicates the correspondence between the correspondence pixel ratio and the correction rate, and the increase rate is corrected using the determined correction rate. FIG. 2 shows an example of the correspondence between the correspondence pixel ratio and the correction rate. If the correspondence pixel ratio and the correction rate have the correspondence in FIG. 2, then the increase rate is corrected five times when the correspondence pixel ratio is 100%.

Then the light emission control unit 106 controls, for each light-emitting device, the emission brightness of the light-emitting device to a value generated by correcting a predetermined reference value using the corrected increase rate. In concrete terms, the emission brightness is controlled to a value generated by multiplying the predetermined reference value by the corrected increase. Therefore the emission brightness of the light-emitting device that emits the light of the intensifying color is controlled to a value generated by correcting the predetermined reference value using the increase rate which was corrected based on the number of correspondence pixels corresponding to the enhancing color. Then the emission brightness of a light-emitting device that emits a light having a color other than the enhancing color is controlled to a value generated by correcting the predetermined reference value using the increase rate determined by the increase rate determination unit 104. In this example, the light emission control unit 106 determines an emission control value that corresponds to the emission brightness after the control, and outputs the determined emission control value to the backlight 101. Thereby the emission brightness of the light-emitting device is controlled to a value according to the emission control value.

The emission brightness of the light-emitting device has an upper limit value. Therefore the light emission control unit 106 limits the corrected increase rate so that the emission brightness of the light-emitting device does not exceed the upper limit value (first limiting process). Then the light emission control unit 106 controls the emission brightness to a value generated by correcting the predetermined reference value by the limited increase rate.

In the display apparatus according to this embodiment, the upper limit value of the display brightness is controlled in accordance with a peak brightness control signal. For example, the display apparatus has a plurality of display modes each of which has a different display brightness, selects one of the plurality of display modes according to the user operation, and generates a peak brightness control signal in accordance with the selected display mode. Then the display apparatus controls the upper limit value of the display brightness to a value in accordance with the peak brightness control signal. For example, as the upper limit value of the display brightness, A [cd/m$^2$] is set in movie mode, B [cd/m$^2$] is set in standard mode, and C [cd/m$^2$] is set in TV mode. Here it is assumed that A<B<C. Such switching of the display brightness is implemented by controlling the emission brightness of the backlight 101. In the case of the above example, the backlight 101 has a capability to emit light at C [cd/m$^2$] or higher emission brightness, and if the display mode is switched to movie mode by user operation, the display brightness is decreased by decreasing the emission brightness of the backlight 101. In this example, the color gamut expansion effect is acquired by enhancing the emission brightness of the light-emitting device using the surplus portion of the emission capability of the backlight 101.

As mentioned above, the emission brightness of the light-emitting device has an upper limit value. The emission brightness also has a lower limit value to implement the display brightness of the upper limit value in accordance with the display mode. For example, if the transmittance of a sub-pixel, when the brightness of the image data is the upper limit value, is 100%, then the light-emitting device must emit light at A [cd/m$^2$] or more, in order to implement the display brightness of the upper limit value A [cd/m$^2$]. The increase rate determination unit 104 determines a higher increase rate as the brightness of the image data is higher, so that the desired display brightness in accordance with the display mode is implemented. Hence the process to set the upper limit value of the display brightness can be regarded as the process to set the upper limit value of the increased rate determined by the increase rate determination unit 104.

The process to set the upper limit value of the increase rate, determined by the increase rate determination unit 104, may be performed by the increase rate determination unit 104, or may be performed by another functional unit. The display apparatus may include a setting unit that sets the upper limit value of the increase rate determined by the increase rate determination unit 104.

The light emission control unit 106 limits the corrected increase rate to value B1/B2 or less, where B1 denotes the upper limit value of the emission brightness, and B2 denotes a value generated by correcting a predetermined reference value using the upper limit value of the increase rate determined by the increase rate determination unit 104. If the upper limit value of the emission brightness is C [cd/m$^2$] and movie mode is set, the corrected increase rate is limited to value C/A or less.

At least one process out of correcting the increase rate, limiting the increase rate, and controlling the emission brightness may be performed by a functional unit that is different from the functional unit that performs the remaining two processes. For example, the display apparatus may have a correction unit to correct the increase rate, a limiting unit to limit the increase rate, and a control unit to control the emission brightness.

In the description of this example, six process steps are performed, that is: determining the increase rate, detecting the correspondence pixels, determining the enhancing color, correcting the increase rate, limiting the increase rate and controlling the emission brightness, but the present invention is not limited to this. At least one of the steps of determining the increase rate, determining the enhancing color, correcting the increase rate and limiting the increase rate may be omitted. The method for controlling the emission brightness is not especially limited if only the emission brightness can be increased for a light-emitting device for which the determination result of the second determination process is affirmative.

The irradiated light quantity determination unit 107 determines the quantity of light that is emitted from the backlight 101 and is irradiated onto the liquid crystal panel 102 (irradiated light quantity) for each correspondence region, based on the emission control value (emission brightness after control) determined by the light emission control unit 106. In this example, the irradiated light quantity is determined for each emission color of the light-emitting device. The light emitted from the light-emitting device leaks into other correspondence regions. Therefore the irradiated light quantity determination unit 107 determines the total value of light emitted from the light-emitting devices in each correspondence region as the irradiated light quantity. The light emitted from the light-emitting device is attenuated and irradiated onto the liquid crystal panel 102. In this example, information (functions, tables) that indicate the correspondence between the distance from the light-emitting device and the arrival rate (or attenuation rate) of light emitted from the light-emitting device is provided in advance. The irradiated light quantity determination unit 107 calculates the irradiated light quantity by adding the light emission amount of each light-emitting device, which is weighted according to this information.

Then the irradiated light quantity determination unit 107 outputs the calculated irradiated light quantity to the correction coefficient determination unit 108. In this example, the irradiated light quantity determination unit 107 normalizes the calculated irradiated light quantity with the irradiated light quantity in the case when emission brightness of all the light-emitting devices are controlled to predetermined reference values (reference light quantity). Then the irradiated light quantity determination unit 107 outputs the normalized irradiated light quantity (irradiated light quantity ratio) to the correction coefficient determination unit 108.

The correction coefficient determination unit 108 determines a correction coefficient to correct the input image data based on the irradiated light quantity of each correspondence region. Then the correction coefficient determination unit 108 outputs the determined correction coefficient to the image correction unit 109.

In this example, the correction coefficient determination unit 108 calculates a color conversion matrix Mstd and a color conversion matrix Mex. In concrete terms, the color conversion matrix Mstd and the color conversion matrix Mex are calculated for each correspondence region. The color conversion matrix Mstd is a matrix to convert input image data into image data that can accurately display the brightness and the color indicated by the input image data. The color conversion matrix Mex is a matrix to convert the input image data into image data where the color gamut of the display image is expanded in the color change direction of the light emitted from the backlight 101. Each component of the color conversion matrix is the correction coefficient.

Figure 3:
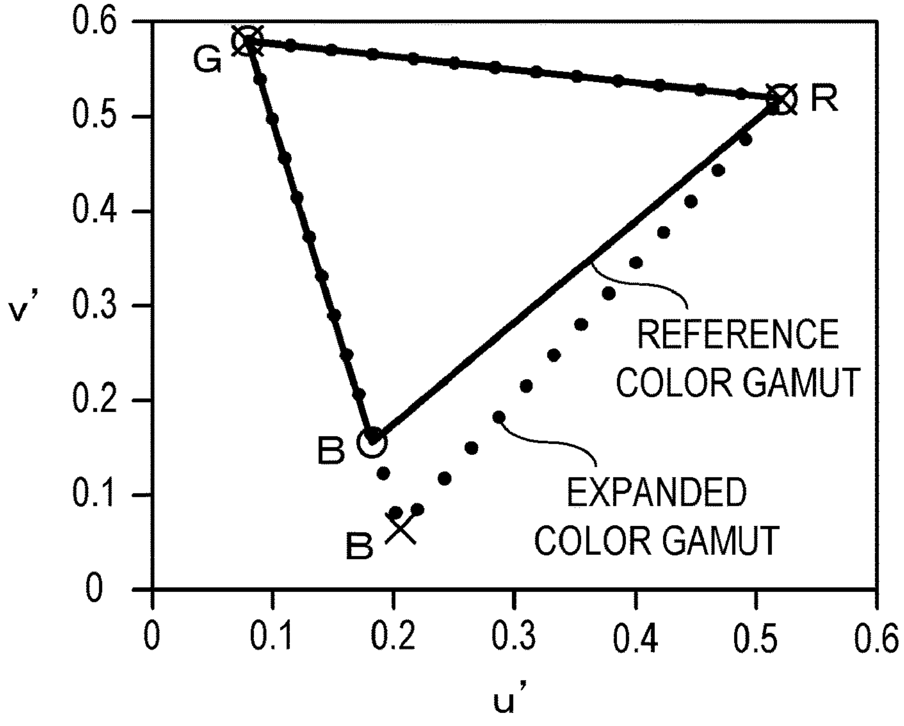
FIG. 3 is a graph depicting an example of a display color gamut of image data after correction according to Example 1.

FIG. 3 shows an example of a display color gamut (color gamut of the display image) of image data converted by the color conversion matrix Mstd and a display color gamut of image data converted by the color conversion matrix Mex. The solid line in FIG. 3 indicates the display color gamut (reference color gamut) of the image data converted by the color conversion matrix Mstd, and the display color gamut indicated by the solid line is the same as the color gamut of the input image data. The dotted line in FIG. 3 indicates the display color gamut (expanded color gamut) of the image data converted by the color conversion matrix Mex. The dotted line in FIG. 3 indicates an example when the color of the light emitted from the backlight 101 has changed in the blue direction. As the dotted line in FIG. 3 shows, the display color gamut has been expanded in the blue direction, which is the change direction of the light emitted from the backlight 101. Further, as the dotted line in FIG. 3 shows, if the color conversion matrix Mex is used, a color having higher color purity than the color indicated by the input image data is acquired as blue of the display image.

The relationship between the pixel value before conversion (R value, G value, B value)=(Rin, Gin, Bin), which is a pixel value of the input image data, and the pixel value after the conversion (Rout, Gout, Bout) can be expressed by Expression 1 shown below using the color matrix M.

[Math. 1]

$$\begin{pmatrix} Rout \\ Gout \\ Bout \end{pmatrix} = M \begin{pmatrix} Rin \\ Gin \\ Bin \end{pmatrix} \quad \text{(Expression 1)}$$

If the emission brightness control using the input image data is not executed, that is if the irradiated light quantity is the reference light quantity, the relationship between the pixel value (RGB value) of the input image data and the XYZ tristimulus value of the display image can be expressed by Expression 2 shown below using the matrix XYZstd.

[Math. 2]

$$\begin{pmatrix} X \\ Y \\ Z \end{pmatrix} = XYZstd \begin{pmatrix} Rin \\ Gin \\ Bin \end{pmatrix} \quad \text{(Expression 2)}$$

$$XYZstd = \begin{pmatrix} XstdR & XstdG & XstdB \\ YstdR & YstdG & YstdB \\ ZstdR & ZstdG & ZstdB \end{pmatrix}$$

If the emission brightness control using the input image data is executed, the X value TXR of the display image corresponding to the pixel value (1, 0, 0) of the input image data can be expressed by Expression 3 shown below. In Expression 3, GR denotes a ratio of the light emitted from the R device with respect to the irradiated light quantity, GG denotes a ratio of the light emitted from the G device with respect to the irradiated light quantity, and GB denotes a ratio of the light emitted from the B device with respect to the irradiated light quantity. TXRLr denotes a transmittance when the light emitted from the R device transmits through the R sub-pixel. TXRLg denotes a transmittance which the light emitted from the G device transmits through the R sub-pixel. TXRLb denotes a transmittance when the light emitted from the B device transmits through the R sub-pixel. TXRLr, TXRLg and TXRLb are all transmittances with respect to the X values.

$$TXR=TXRLr\times GR+TXRLg\times GG+TXRLb\times GB \quad \text{(Expression 3)}$$

In the same manner, The Y value TYR of the display image corresponding to the pixel value (1, 0, 0) of the input image data can be expressed by Expression 4 shown below, and the Z value TZR of the display image corresponding to the pixel value (1, 0, 0) of the input image data can be expressed by Expression 5 shown below.

$$TYR=TYRLr\times GR+TYRLg\times GG+TYRLb\times GB \quad \text{(Expression 4)}$$

$$TZR=TZRLr\times GR+TZRLg\times GG+TZRLb\times GB \quad \text{(Expression 5)}$$

In Expressions 4 and 5, TYRLr and TZRLr are transmittances when the light emitted from the R device transmit through the R sub-pixel. TYRLg and TZRLg are transmittances when the light emitted from the G device transmits through the R sub-pixel. TYRLb and TZRLb are transmittances when the light emitted from the B device transmits through the R sub-pixel. TYRLr, TYRLg and TYRLb are all transmittances on the Y value, and TZRLr, TZRLg and TZRLb are all transmittances on the Z value.

In the same manner, the X value TXG, the Y value TYG and the Z value TZG of the display image corresponding to the pixel value (0, 1, 0) of the input image data can be expressed by Expressions 6 to 8 shown below.

$$TXG=TXGLr\times GR+TXGLg\times GG+TXGLb\times GB \quad \text{(Expression 6)}$$

$$TYG=TYGLr\times GR+TYGLg\times GG+TYGLb\times GB \quad \text{(Expression 7)}$$

$$TZG=TZGLr\times GR+TZGLg\times GG+TZGLb\times GB \quad \text{(Expression 8)}$$

In Expressions 6 to 8, TXGLr, TYGLr and TZGLr are all transmittances when the light emitted from the R device transmits through the G sub-pixel. TXGLg, TYGLg and TZGLg are all transmittances when the light emitted from the G device transmits through the G sub-pixel. TXGLb, TYGLb and TZGLb are all transmittances when the light emitted from the B device transmits through the G sub-pixel. TXGLr, TXGLg and TXGLb are all transmittances on the X value. TYGLr, TYGLg and TYGLb are all transmittances on the Y value. TZGLr, TZGLg and TZGLb are all transmittances on the Z value.

In the same manner, the X value TXB, the Y value TYB and the Z value TZB of the display image corresponding to the pixel value (0, 0, 1) of the input image data can be expressed by Expression 9 to 11 shown below.

$$TXB=TXBLr\times GR+TXBLg\times GG+TXBLb\times GB \quad \text{(Expression 9)}$$

$$TYB=TYBLr\times GR+TYBLg\times GG+TYBLb\times GB \quad \text{(Expression 10)}$$

$$TZB=TZBLr\times GR+TZBLg\times GG+TZBLb\times GB \quad \text{(Expression 11)}$$

In Expressions 9 to 11, TXBLr, TYBLr and TZBLr are all transmittances when the light emitted from the R device transmits through the B sub-pixel. TXBLg, TYBLg and TZBLg are all transmittances when the light emitted from the G device transmits through the B sub-pixel. TXBLb, TYBLb and TZBLb are all transmittances when the light emitted through the B device transmits through the B sub-pixel. TXBLr, TXBLg and TXBLb are all transmittances on the X value. TYBLr, TYBLg and TYBLb are all transmittances on the Y value. TZBLr, TZBLg and TZBLb are all transmittances on the Z value.

The relationship between the pixel value after conversion and the XYZ tristimulus value of the display image can be expressed by Expression 12 shown below.

[Math. 3]

$$\begin{pmatrix} X \\ Y \\ Z \end{pmatrix} = Txyz \begin{pmatrix} Rout \\ Gout \\ Bout \end{pmatrix} \quad \text{(Expression 12)}$$

$$Txyz = \begin{pmatrix} TXR & TXG & TXB \\ TYR & TYG & TYB \\ TZR & TZG & TZB \end{pmatrix}$$

If XYZ of the display image are the same whether emission brightness control using the input image data is executed or not, then the same display image can be acquired whether emission brightness control using the input image data is executed or not. In other words, if the XYZ tristimulus value of the display image is the same whether emission brightness control using the input image data is executed or not, the display image accurately reproducing the brightness and colors of the input image data can be acquired. Based on the condition that "the XYZ tristimulus value of the display image is the same whether emission brightness control using the input image data is executed or not", and on Expressions 2 and 12, Expression 13 shown below is acquired.

[Math. 4]

$$\begin{pmatrix} Rout \\ Gout \\ Bout \end{pmatrix} = Txyz^{-1} XYZstd \begin{pmatrix} Rin \\ Gin \\ Bin \end{pmatrix} \quad \text{(Expression 13)}$$

Then Expression 14 shown below, which indicates the color conversion matrix Mstd, is acquired based on Expressions 1 and 13.

$$Mstd = Txyz^{-1} XYZstd \quad \text{(Expression 14)}$$

The correction coefficient determination unit 108 calculates the inversion matrix $Txyz^{-1}$ based on the irradiated light quantity ratio determined by the irradiated light quantity determination unit 107 using Expression 3 to 11. Then the correction coefficient determination unit 108 calculates the color conversion matrix Mstd from the calculated inverse matrix $Txyz^{-1}$ and the matrix XYZstd provided in advance.

A table or a function for inputting the irradiated light quantity ratio and outputting the color conversion matrix Mstd may be provided in advance. The color conversion matrix Mstd may be determined from the irradiated light quantity ratio determined by the irradiated light quantity determination unit 107, using such a table or a function.

The chromaticity coordinates (u'b(R), v'b(R)) of the display color (color on the screen) for red, when the emission brightness control using the input image data is executed, can be calculated by Expression 15 shown below. In other words, the chromaticity coordinates (u'b(R), v'b(R)) can be calculated using the XYZ tristimulus value (X(R), Y(R) and Z(R)) acquired by substituting (4095, 0, 0) for the pixel value (Rout, Gout, Bout) after the change based on Expression 12. 4095 is the maximum value that the sub-pixel value can be after the change, and 0 is the minimum value that the sub-pixel value can be after the change.

[Math. 5]

$$\begin{pmatrix} X\ (R) \\ Y\ (R) \\ Z\ (R) \end{pmatrix} = Txyz \begin{pmatrix} 4095 \\ 0 \\ 0 \end{pmatrix} \quad \text{(Expression 15)}$$

$$u'\ b\ (R) = \frac{4 \times X\ (R)}{X\ (R) + 15 \times Y\ (R) + 3 \times Z\ (R)}$$

$$v'\ b\ (R) = \frac{9 \times Y\ (R)}{X\ (R) + 15 \times Y\ (R) + 3 \times Z\ (R)}$$

In the same manner, the chromaticity coordinates (u'b(G), v'b(G)) of the display color for green, when the emission brightness control using the input image data is executed, can be calculated by Expression 16 shown below.

[Math. 6]

$$\begin{pmatrix} X\ (G) \\ Y\ (G) \\ Z\ (G) \end{pmatrix} = Txyz \begin{pmatrix} 0 \\ 4095 \\ 0 \end{pmatrix} \quad \text{(Expression 16)}$$

$$u'\ b\ (G) = \frac{4 \times X\ (G)}{X\ (G) + 15 \times Y\ (G) + 3 \times Z\ (G)}$$

$$v'\ b\ (G) = \frac{9 \times Y\ (G)}{X\ (G) + 15 \times Y\ (G) + 3 \times Z\ (G)}$$

The chromaticity coordinates (u'b(R), v'b(R)) of the display color for blue, when the emission brightness control using the input image data is executed, can be calculated by Expression 17 shown below.

[Math. 7]

$$\begin{pmatrix} X\ (B) \\ Y\ (B) \\ Z\ (B) \end{pmatrix} = Txyz \begin{pmatrix} 0 \\ 0 \\ 4095 \end{pmatrix} \quad \text{(Expression 17)}$$

$$u'\ b\ (B) = \frac{4 \times X\ (G)}{X\ (B) + 15 \times Y\ (G) + 3 \times Z\ (G)}$$

$$v'\ b\ (B) = \frac{9 \times Y\ (B)}{X\ (B) + 15 \times Y\ (B) + 3 \times Z\ (B)}$$

The color difference Δu'v'(R) between the display color for red and the display color for white, when emission brightness control using the input image data is not executed, can be calculated by Expression 18-1 shown below. The color difference Δu'v'(G) between the display color for green and the display color for white, when emission brightness control using the input image data is not executed, can be calculated by Expression 18-2 shown below. And the color difference Δu'v'(B) between the display color for blue and the display color for white, when emission brightness control using the input image data is not executed, can be calculated by Expression 18-3 shown below.

In the same manner, the color difference Δu'v'b(R) between the display color for red and the display color for white, when emission brightness control using the input image data is executed, can be calculated by Expression 18-4 shown below. The color difference Δu'v'b(G) between the display color for green and the display color for white, when emission brightness color control using the input image data is executed, can be calculated by Expression 18-5 shown below. And the color difference Δu'v'b(B)

between the display color for blue and the display color for white, when emission brightness control using the input image data is executed, can be calculated by Expression 18-6 shown below.

[Math. 8]

$$\Delta u'v'(R)=\sqrt{(u'(R)-u'(W))^2+(v'(R)-v'(W))^2} \quad \text{(Expression 18-1)}$$

$$\Delta u'v'(G)=\sqrt{(u'(G)-u'(W))^2+(v'(G)-v'(W))^2} \quad \text{(Expression 18-2)}$$

$$\Delta u'v'(B)=\sqrt{(u'(B)-u'(W))^2+(v'(B)-v'(W))^2} \quad \text{(Expression 18-3)}$$

$$\Delta u'v'b(R)=\sqrt{(u'b(R)-u'(W))^2+(v'b(R)-v'(W))^2} \quad \text{(Expression 18-4)}$$

$$\Delta u'v'b(G)=\sqrt{(u'b(G)-u'(W))^2+(v'b(G)-v'(W))^2} \quad \text{(Expression 18-5)}$$

$$\Delta u'v'b(B)=\sqrt{(u'b(B)-u'(W))^2+(v'b(B)-v'(W))^2} \quad \text{(Expression 18-6)}$$

In Expressions 18-1 to 18-3, u'(R) and v'(R) denote the chromaticity coordinates of the display color for red when emission brightness control using the input image data is not executed. u'(G) and v'(G) denote the chromaticity coordinates of the display color for green when emission brightness control using the input image data is not executed. And u'(B) and v'(B) denote the chromaticity coordinates of the display color for blue when emission brightness control using the input image data is not executed.

In Expressions 18-1 to 18-6, u'(W) and v'(W) denote the chromaticity coordinates of the display color for white.

The correction coefficient determination unit 108 calculates the matrix Txyz from the irradiated light quantity ratio determine by the irradiated light quantity determination unit 107 using Expressions 3 to 11. Then from the calculated matrix Txyz, the correction coefficient determination unit 108 calculates the color difference for each display color, in the case when emission brightness control using the input image data is executed, by computing Expressions 15 to 17 and 18-4 to 18-6. In the same manner, the correction coefficient determination unit 108 calculates the color different for each display color in the case when emission brightness control using the input image data is not executed, by computing Expressions 18-1 to 18-3. Here it is assumed that the components u'(R), v'(R), u'(G), v'(G), u'(B), v'(B), u'(W) and v'(W) of the chromaticity coordinates are provided in advance.

Then the correction coefficient determination unit 108 calculates the distance between the color difference Δu'v'b and the color difference Δu'v' for each display color as indicated in Expression 19 shown below. The correction coefficient determination unit 108 determines that a color, of which the difference of the color difference is the greatest, is the color component of which color gamut of the display image should be expanded (expansion direction). Hereafter a color, of which difference of the color difference is the greatest, is referred to as "image enhancing color".

$$\text{Red}:\Delta u'v'b(R)-\Delta u'v'(R)$$

$$\text{Green}:\Delta u'v'b(G)-\Delta u'v'(G)$$

$$\text{Blue}:\Delta u'v'b(B)-\Delta u'v'(B) \quad \text{(Expression 19)}$$

The method to determine the image enhancing color is not limited to the above method. For example, a table or a function for inputting the irradiated light quantity ratio and outputting the color difference Δu'v'b may be provided in advance. The color difference Δu'v'b may be determined from the irradiated light quantity ratio determined by the irradiated light quantity determination unit 107 using such a table or a function. The enhancing color determined by the enhancing color determination unit 105 may be determined as the image enhancing color without computing using the irradiated light quantity ratio.

The color difference for each display color, in the case when the emission brightness control using the input image data is not executed, may be provided in advance.

The matrix XYZex corresponding to the color gamut, expanded by executing emission brightness control using the input image data, can be calculated by Expression 20. Expression 20 is a matrix generated by correcting the X value and the Y value corresponding to the image enhancing color, out of the XYZ tristimulus value included in the matrix XYZstd of Expression 2, based on the XYZ tristimulus value of the image enhancing color in the case when emission brightness control using the input image data is executed. Expression 20 is the case when the image enhancing color is blue. In Expression 20, XstdB of the matrix XYZstd is replaced with X (B)×YstdB/Y (B), and ZstdB is replaced with Z(B)×YstdB/Y(B). If conversion is performed by the matrix XYZex, then the color gamut of the display image can be expanded, just like the color gamut of the light emitted from the backlight 101, without changing the Y component corresponding to the display brightness.

[Math. 9]

$$XYZex=\begin{pmatrix} XstdR & XstdG & X(B)\times YstdB/Y(B) \\ YstdR & YstdG & YstdB \\ ZstdR & ZstdG & Z(B)\times YstdB/Y(B) \end{pmatrix} \quad \text{(Expression 20)}$$

Then the matrix XYZstd of Expression 14 is replaced with XYZex, whereby Expression 21 shown below, which indicates the color conversion matrix Mex, is acquired.

$$Mex=Txyz^{-1}XYZex \quad \text{(Expression 21)}$$

The correction coefficient determination unit 108 calculates the matrix XYZex in accordance with the image enhancing color. Then the correction coefficient determination unit 108 calculates the color conversion matrix Mex from the calculated $Txyz^{-1}$ and the matrix XYZex.

A table or a function for inputting the irradiated light quantity ratio and outputting the color conversion matrix Mex may be provided in advance for each image enhancing color. Then the color conversion matrix Mex may be determined from the irradiated light quantity ratio determined by the irradiated light quantity determination unit 107, using such a table or a function corresponding to the determined image enhancing color.

The image correction unit 109 corrects the input image data in accordance with the emission brightness of the plurality of light-emitting devices. In this example, when the emission brightness of the light source corresponding to the correspondence region where dark image data is displayed, is controlled, the image process to expand pixel values is performed for the image data in this correspondence region. Thereby black floating of a dark image are decreased, and power consumption of the backlight 101 is reduced without dropping the display brightness (brightness on the screen) of the liquid crystal panel. The "image process to expand the pixel values for the image data" can be regarded as an "image process to increase the transmittance of the liquid crystal panel 102". In this example, the ratio of the emission brightness of the plurality of light-emitting devices of the light source is changed based on the number of correspondence pixels of the enhancing color, but the input image data is corrected based on the respective emission brightness of the plurality of light-emitting devices of the light source. Thereby the color purity of the color of the display image corresponding to the enhancing color can be increased, and the color gamut of the display image can be expanded.

In concrete terms, the image correction unit 109 corrects the input image data using the color conversion matrix Mstd and the color conversion matrix Mex determined by the correction coefficient determination unit 108. If the color conversion matrix Mstd is used, the display image, the same as the case when the emission brightness control using the input image data is not executed, can be acquired.

If the color conversion matrix Mstd is used, the display image, in which the color gamut is expanded in the same manner as the color gamut of the light emitted from the backlight 101, can be acquired.

In this example, both the color conversion matrix Mstd and the color conversion matrix Mex are used.

Then the image correction unit 109 outputs the corrected image data to the liquid crystal panel 102. Thereby the light from the backlight 101 is transmitted through the liquid crystal panel 102 based on the corrected image data.

Only one of the color conversion matrix Mstd and the color conversion matrix Mex may be used. For example, the color conversion matrix Mstd may be used exclusively, or the color conversion matrix Mex may be used exclusively. Either one of the color conversion matrix Mstd and the color conversion matrix Mex may be selected according to user operation, type of input image data, installation environment of the display apparatus and the like, and the input image data may be corrected using the selected color conversion matrix.

Figure 4:
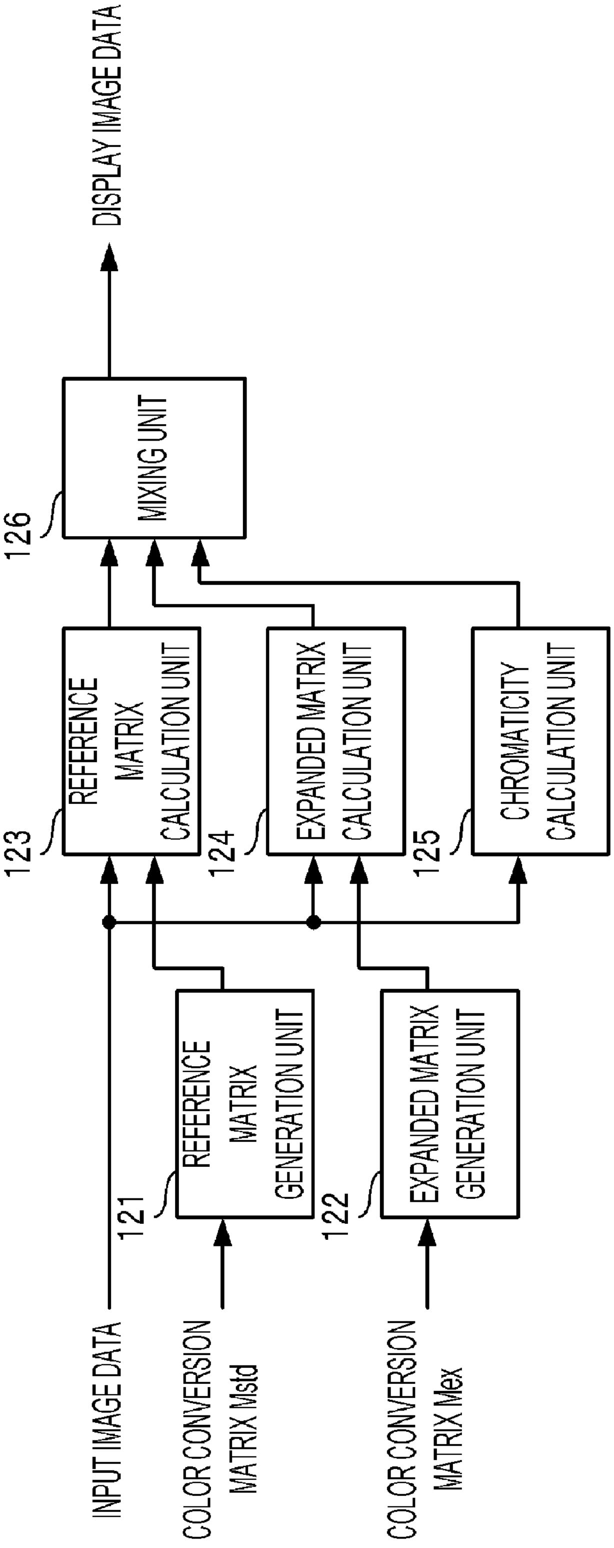
FIG. 4 is a block diagram depicting an example of a functional configuration of an image correction unit according to Example 1.

FIG. 4 is an example of a functional configuration of the image correction unit 109. The image correction unit 109 includes a reference matrix generation unit 121, an expanded matrix generation unit 122, a reference matrix calculation unit 123, an expanded matrix calculation unit 124, a chromaticity calculation unit 125 and a mixing unit 126.

The reference matrix generation unit 121 calculates a color conversion matrix (reference matrix) for each pixel using the color conversion matrix Mstd for each correspondence region. In concrete terms, the reference matrix for each pixel is calculated by combining the color conversion matrix Mstd for each correspondence region, so that the change of the color conversion matrix becomes smooth in the space direction of the image, and also the color conversion matrix is set for the pixel positions where the color conversion matrix Mstd is not calculated. The reference matrix generation unit 121 outputs the reference matrix for each pixel to the reference matrix calculation unit 123.

The expanded matrix generation unit 122 calculates the color conversion matrix (expanded matrix) for each pixel using the color conversion matrix Mex for each correspondence region. In concrete terms, the expanded matrix for each pixel is calculated by combining the color conversion matrix Mex for each correspondence region, so that the change of the color conversion matrix becomes smooth in the space direction of the image, and also the color conversion matrix is set for the pixel position where the color conversion matrix Mex is not calculated. The expanded matrix generation unit 122 outputs the expanded matrix for each pixel to the expanded matrix calculation unit 124.

The reference matrix calculation unit 123 converts the input image data using the reference matrix. In concrete terms, for each pixel, the input pixel value (pixel value of the input image data) of the pixel is converted using the reference matrix of this pixel. The reference matrix calculation unit 123 outputs the image data converted using the reference matrix to the mixing unit 126, as the reference conversion image data.

The expanded matrix calculation unit 124 converts the input image data using the expanded matrix. In concrete terms, for each pixel, the input pixel value of the pixel is converted using the expanded matrix of this pixel. The expanded matrix calculation unit 124 outputs the image data converted using the expanded matrix to the mixing unit 126, as the expanded conversion image data.

The chromaticity calculation unit 125 calculates, for each pixel, the chromaticity coordinate (u', v') indicated by the pixel value of the input image data as the input chromaticity. Then the chromaticity calculation unit 125 outputs the input chromaticity for each pixel to the mixing unit 126.

The mixing unit 126 calculates a combined pixel value by combining, for each pixel, a reference conversion pixel value (pixel value of the reference conversion image data) of the pixel and an expanded conversion pixel value (pixel value of the expanded conversion image data) of the pixel with weight in accordance with the input chromaticity of the pixel. Then the mixing unit 126 outputs the combined image data (display image data) including the combined pixel value of each pixel to the liquid crystal panel 102.

In concrete terms, the mixing unit 126 calculates the difference between the input chromaticity and the display color for red in the case when the emission brightness control using the input image data is not executed (R color difference). In the same manner, the mixing unit 126 calculates the G color difference and the B color difference. The G color difference is a difference between the input chromaticity and the display color for green in the case when the emission brightness control using the input image data is not executed. The B color difference is a difference between the input chromaticity and the display color for blue in the case when the emission brightness control using the input image data is not executed.

Then the mixing unit 126 selects the smallest value of the absolute value of the R color difference, the absolute value of the G color difference, and the absolute value of the B color difference, as the minimum color difference.

Then the mixing unit 126 determines the mixing ratio so that the ratio of the expanded conversion pixel value, with respect to the reference conversion pixel value, becomes smaller as the minimum color difference is greater. In this example, a case when the ratio of the expanded conversion pixel value, with respect to the reference conversion pixel value, is determined as the mixing ratio, is described, but the mixing ratio is not limited to this. For example, the mixing ratio may be a ratio of the reference conversion pixel value with respect to the expanded conversion pixel value.

Figure 5:
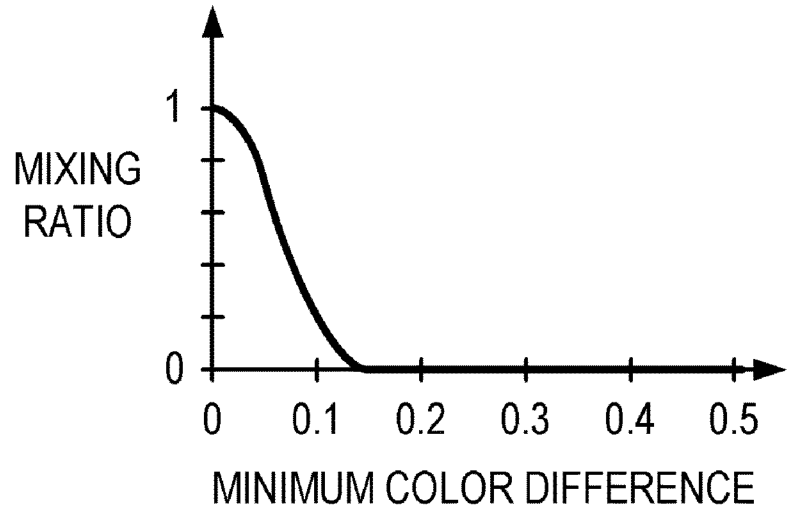
FIG. 5 is a graph depicting an example of a relationship between a minimum color difference and a mixing ratio according to Example 1.

FIG. 5 shows an example of the relationship between the minimum color difference and the mixing ratio. The mixing unit 126 determines the mixing ratio using a table or a function that indicates the relationship shown in FIG. 5.

According to the example in FIG. 5, if the minimum color difference is 0, that is if the input chromaticity is red, green or blue, then 1 is acquired as the mixing ratio, and the expanded conversion pixel value is acquired as the combined pixel value. If the input chromaticity is red, green or blue, then a value greater than 0 is acquired as the minimum color difference. As the minimum color difference is greater, a smaller mixing ratio is acquired, and as the minimum color difference is greater, a combined pixel value closer to the reference conversion pixel value is acquired. In the example in FIG. 5, 0 is acquired as the mixing ratio, and the reference conversion pixel value is acquired as the combined pixel value when the minimum color difference is greater than approximately 0.15.

Figure 6:
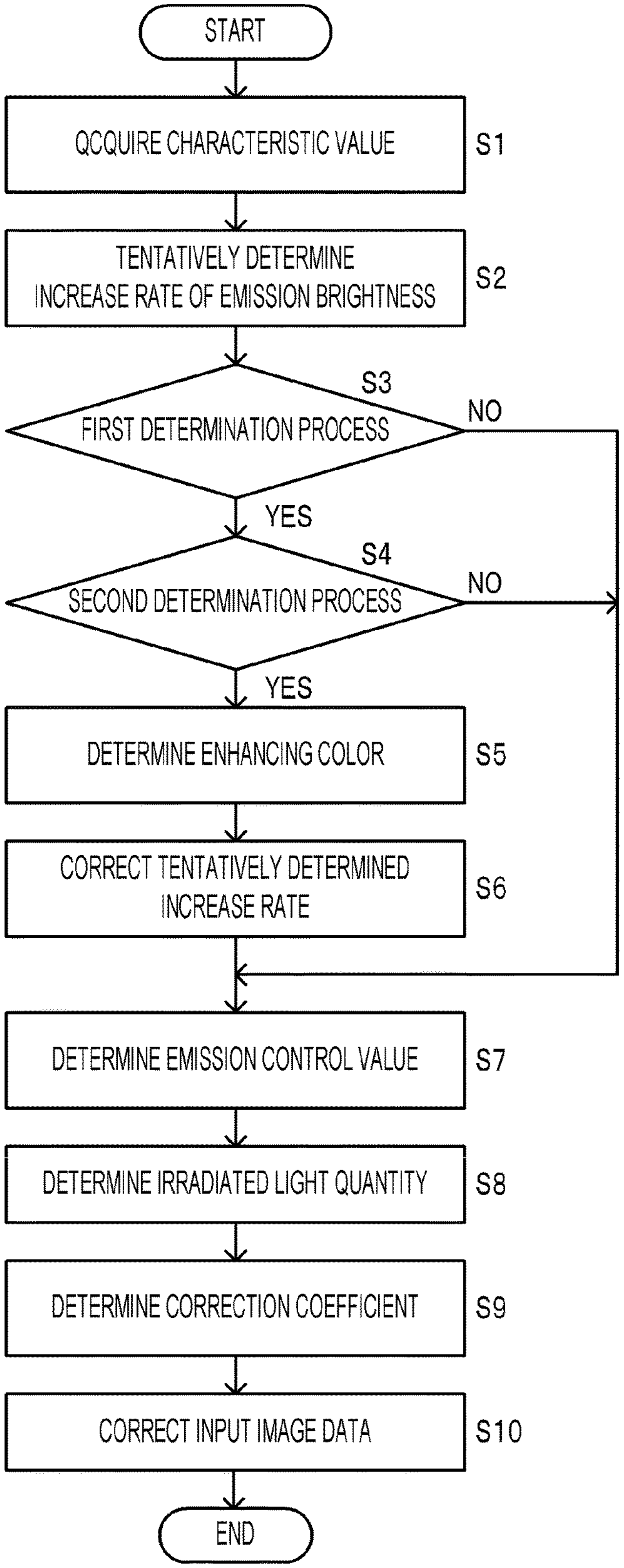
FIG. 6 is a flow chart depicting an example of a process flow of the display apparatus according to Example 1.

Now an example of the process flow of the display apparatus according to this example will be described with reference to the flow chart in FIG. 6.

First the characteristic value acquisition unit 103 acquires, as the characteristic value for each correspondence region, the maximum value of the R value, the maximum value of the G value, and the maximum value of the B value of the image data (a part of the input image data) that should be displayed in each correspondence region (S1). In this step, the characteristic value acquisition unit 103 counts, for each correspondence region, the total number of the non-correspondence pixels, the total number of R single color pixels, the total number of G single color pixels, and the total number of B single color pixels.

Then the increase rate determination unit 104 tentatively determines, for each correspondence region, the increase rate of the R device, the G device and the B device, based on the characteristic value acquired in S1 (S2).

Then the enhancing color determination unit 105 determines, for each correspondence region, whether the ratio of the total number of non-correspondence pixels, that should be displayed in the correspondence region with respect to the total number of pixels of this correspondence region, is a first ratio "1/3" or more (S3: first determination process).

If there is a correspondence region for which the determination result in S3 is affirmative, the process advances from S3 to S4. If there is no correspondence region for which the determination result in S3 is affirmative, process advances from S3 to S7, where the increase rate tentatively determined in S2 is finally determined as a final value.

The first ratio is not limited to 1/3. For example, the first ratio may be 1/2 or 1/4. The first ratio may be a fixed value determined by a manufacturer in advance, or may be a value which the user can freely set or change.

In S4, the enhancing color determination unit 105 determines, for each light-emitting device corresponding to the correspondence region for which the determination result in S3 is affirmative, whether the ratio of the total number of correspondence pixels detected for this light-emitting device with respect to the total number of pixels of the correspondence region that corresponds to this light-emitting device is a second ratio "1/2" or more. The process in S4 is the above mentioned second determination process. If there is a light-emitting device for which the determination result in S4 is affirmative, the process advances from S4 to S5. If there is no light-emitting device for which the determination result in S4 is affirmative, the process advances from S4 to S7, where the increase rate determined in S2 is finally determined as a final value.

The second ratio is not limited to 1/2. For example, the second ratio may be 1/3 or 1/4. The second ratio may be a fixed value determined by a manufacturer in advance, or may be a value which the user can freely set or change. The second ratio may have a same value as the first ratio, or a different value from the first ratio.

In S5, the enhancing color determination unit 105 determines, for each correspondence region, emission color of the light-emitting device for which the determination result of S4 is affirmative, as the enhancing color.

Then the light emission control unit 106 increases the increase rate of the light-emitting device that emits the light of the enhancing color (S6: correction of tentatively determined increase rate). The increase rate of the light-emitting device that emits the light of the enhancing color is increased (enhanced) based on: the total number of correspondence pixels detected for the light-emitting device that emits the light of the enhancing color; and the value that is set as the upper limit value of the display brightness. By this process, the increase rate is finally determined as a final value.

Then the light emission control unit 106 determines, for each light-emitting device, an emission control value based on the finally determined increase rate and the reference control value (emission control value corresponding to the predetermined reference value) (S7). If the process in S6 is executed, the emission control value is determined using the increase rate (corrected increaser rate) after the process in S6, and if the process in S6 is not executed, the emission control value is determined using the increase rate which was tentatively determined in S3. The light emission control unit 106 outputs the emission control value for each light-emitting device to the backlight 101 and the irradiated light quantity determination unit 107. Each light-emitting device of the backlight 101 emits light with the emission control value outputted from the light emission control unit 106.

Then the irradiated light quantity determination unit 107 determines, for each correspondence region, the irradiated light quantity based on the emission control value of each light-emitting device (S8). In this example, the irradiated light quantity is determined for each emission color of the light-emitting device.

Then the correction coefficient determination unit 108 determines, for each correspondence region, a correction coefficient based on the irradiated light quantity (S9).

Then the image correction unit 109 corrects the input image data based on the correction coefficient for each correspondence region determined in S7, and outputs the corrected image data to the liquid crystal panel 102 (S10). Thereby the light emitted from the backlight 101 is transmitted at a transmittance based on the corrected image data, and an image is displayed on the screen.

The effect of this example will now be described with reference to FIG. 11.

FIG. 11 is a diagram depicting an example of the color gamut expansion effect implemented by controlling the emission color of the backlight having three light-emitting devices: the R device, the G device and the B device. (a) of FIG. 11 shows an example when the input image data is blue single color image data. (b) of FIG. 11 shows an example when the input image data is image data where a white object exists with a blue background. In concrete terms, the input image data in (b) of FIG. 11 includes a region of blue sky and a region of white clouds. In FIG. 11 an "image" refers to an image expressed by input image data, "emission brightness of backlight" refers to the emission brightness of the R device, the G device and the B device, "emission color of backlight" refers to the XYZ tristimulus value expressing the emission color of the backlight. And "correction rate of image" refers the correction rate of when the input image data corrected according to the emission color of the backlight (correction rate of the transmittance of the liquid crystal panel). In concrete terms, "correction rate of image" refers to the correction rate of the sub-pixel value of red, the correction rate of the sub-pixel value of green, and the correction rate of the sub-pixel value of blue. In FIG. 11, the inverse number of the emission brightness of the light-emitting device is set as a correction rate of the sub-pixel value of a color the same as the emission color of the light-emitting device. "Display color of blue" refers to the XYZ tristimulus value expressing blue of the display image, and "color gamut expansion effect" refers to the content of the color gamut expansion effect.

In the example of (a) of FIG. 11, only blue exists in the image, hence the input image data can be accurately displayed if the B device is lit. According to the technique disclosed in Japanese Patent Application Laid-open No. 2009-53687, the emission brightness of the R device and the G device is reduced (light reduction of R device and G device). Therefore the color purity and the chroma of blue in the display image can be increased, and the color gamut of the display image can be expanded in the blue direction. And according to the technique disclosed in Japanese Patent Application Laid-open No. 2007-322944, the emission color of the light source is controlled to be blue, hence the color purity and the chroma of blue in the display image can be increased, and the color gamut of the display image can be expanded in the blue direction.

In the example of (b) of FIG. 11 however, a plurality of colors (white and blue) exist in the image. Therefore according to the technique disclosed in Japanese Patent Application Laid-open No. 2009-53687, the dominant color component of the input image data may not be detected. If the dominant color component is not detected, light of the R device and the G device is not reduced, and the color gamut expansion effect cannot be acquired, as shown in (b) of FIG. 11. In concrete terms, the R device, the G device and the B device are lit at a same emission brightness so that the display of white has precedence, therefore the color gamut expansion effect cannot be implemented. According to the technique disclosed in Japanese Patent Application Laid-open No. 2007-322944, the emission color of the backlight is controlled to an intermediate color of a plurality of colors existing in the image, hence the high color gamut expansion effect cannot be implemented when a plurality of colors exists in an image.

(c) of FIG. 11 shows an example of the effect of this example. In (c) of FIG. 11, an effect that focuses on one correspondence region is illustrated for simplification. (c) of FIG. 11 is an example when the input image data (to be specific, image data that should be displayed on the correspondence region) is image data where a white object exists with a blue background. In concrete terms, the input image data in (c) of FIG. 11 includes a region of blue sky and a region of white clouds.

In the example in (c) of FIG. 11, a large number of blue pixels exist, therefore blue is set as the enhancing color, and the emission brightness of the B device is increased (boost of B device). As a result, the color purity and the chroma of blue in the display image can be increased, and the color gamut of the display image can be expanded in the blue direction. Furthermore, the correction rate in accordance with the increase of the emission brightness of the B device is set, hence the change of chromaticity of white, due to the increase in emission brightness of the B device, can be suppressed.

In (c) of FIG. 11, the correction rate, that is different from the above mentioned correction coefficient, is shown for simplification, but a similar effect can be implemented even if the above mentioned correction coefficient is used.

Further, the above mentioned effect is implemented for the entire screen.

As described above, according to this example, when the ratio of the total number of non-correspondence pixels with respect to the total number of pixels of the image data is the first ratio or more, the emission brightness of the light-emitting device, of which ratio of the total number of correspondence pixels with respect to the total number of pixels of the image data is the second ratio or more, is increased. The emission brightness of the light-emitting device, of which ratio of the total number of correspondence pixels with respect to the total number of pixels of the image data is the second ratio or more, is controlled to be a higher value as the number of correspondence pixels detected for the light-emitting device is greater. Thereby the color gamut of the display image can be expanded with high precision. In concrete terms, the color gamut of the display image can be expanded with high precision even if a plurality of colors exists in the image.

Moreover, according to this example, the input image data is corrected in accordance with the emission brightness of a plurality of light-emitting devices. Therefore the color gamut of the display image can be expanded with even higher precision, compared with the case of not correcting the input image data.

Even if the image process is not executed, the color gamut of the display image can be expanded if the emission brightness of the light-emitting device, of which ratio of the total number of correspondence pixels with respect to the total number of pixels of the image data is the second ratio or more, can be increased. This means that execution of the image process is unnecessary.

In (c) of FIG. 11, one correspondence region is focused on for simplification, but a similar effect can be implemented even if all the correspondence regions or the entire region of the screen is focused on.

In this example, a case when the emission brightness is controlled for each light-emitting region was described, but the emission brightness of the entire backlight 101 may be controlled in tandem, instead of controlling the emission brightness for each light-emitting region. If the emission brightness of the entire backlight 101 is controlled in tandem, the entire light-emitting surface of the backlight 101 is regarded as one light-emitting region, and a process the same as the above mentioned process is performed. Thereby the color gamut of the display image can be expanded with high precision. However if the emission brightness is controlled for each light-emitting region, the color gamut of the display image can be expanded with even higher precision than controlling the emission brightness of the entire backlight 101 in tandem.

In this example, the enhancing color is determined based on the number of correspondence pixels, but the enhancing color may be determined by another method. For example, if the color gamut of the input image data is wider than the display color gamut in the case when the emission brightness of each light-emitting device is controlled to a predetermined reference value, the enhancing color may be determined based on the statistical information of non-reproduced pixels of the input image data. A non-reproduced pixel is a pixel having a pixel value that indicates the chromaticity outside the display color gamut, in the case when the emission brightness of each light-emitting device is controlled to a predetermined reference value.

If the color gamut of the input image data is wider than the display color gamut in the case when the emission brightness of each light-emitting device is controlled to be a predetermined reference value, the display image may be changed considerably by the image process using the color conversion matrix Mex. Therefore in such a case, 0 may be set for the mixing ratio in order to acquire the same display image as the case when emission brightness control using the input image data is not executed. If 0 is used for the mixing ratio, the process to determine the color conversion matrix Mex is unnecessary.

In this example, the irradiated light quantity is calculated by adding the light emission amount of each light-emitting device with weight, but the method for acquiring the irradiated light quantity is not limited to this. For example, a photosensor to detect the quantity of light irradiated from the backlight 101 to the liquid crystal panel 102 is installed in each light-emitting region, and the detected value of the photosensor may be acquired as the irradiated light quantity.

Example 2

A display apparatus and a control method thereof according to Example 2 of the present invention will now be described.

In Example 1, a case of limiting the corrected increase rate based on the upper limit value of the display brightness (upper limit value of the increase rate determined by the increase rate determination unit 104) was described. In Example 2, a case of limiting the corrected increase rate based on the operation mode of the image process will be described.

The relationship between the increase rate and the gradation of an image data will be described.

In this example, image process is performed in the same way as Example 1. In the case of executing the image process in the same way as Example 1, the light emission amount of the backlight 101 is in inverse proportion to the pixel value after the image process (after correction). Therefore if the emission brightness of the light-emitting device is increased to expand the display color gamut, the pixel value is decreased by the image process. As a result, gradation of the image data (resolution of gradation) drops, and gradation of the display image also drops.

Figure 7:
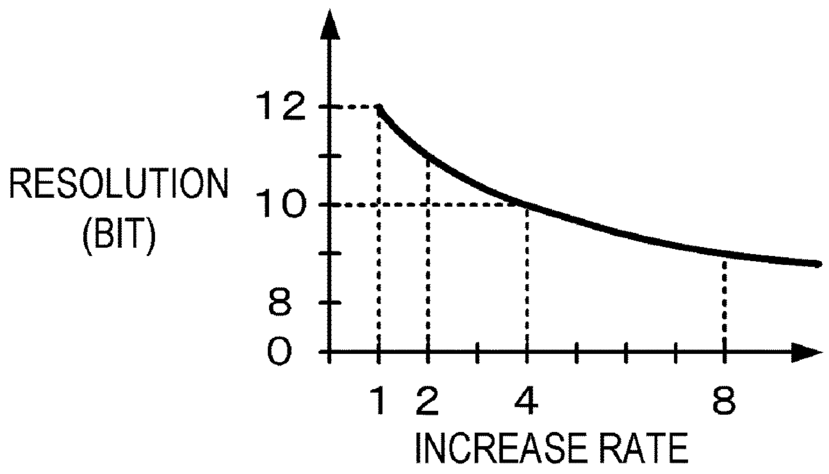
FIG. 7 is a graph depicting an example of a relationship between the increase rate and the resolution of gradation according to Example 2.

FIG. 7 shows an example of a relationship between the increase rate and the resolution of gradation. In the example in FIG. 7, the resolution of gradation is a value equivalent to 12 bits when the increase rate is 1, that is, when the emission brightness of the light-emitting device is a predetermined reference value. However if the increase rate is 4, the resolution of gradation drops to a value equivalent to 10 bits. Thus expanding the color gamut by increasing the increase rate is in a trade-off relationship with increasing the gradation of the display image.

Therefore in this example, the corrected increase rate is limited based on the operation mode of the image process.

Figure 8:
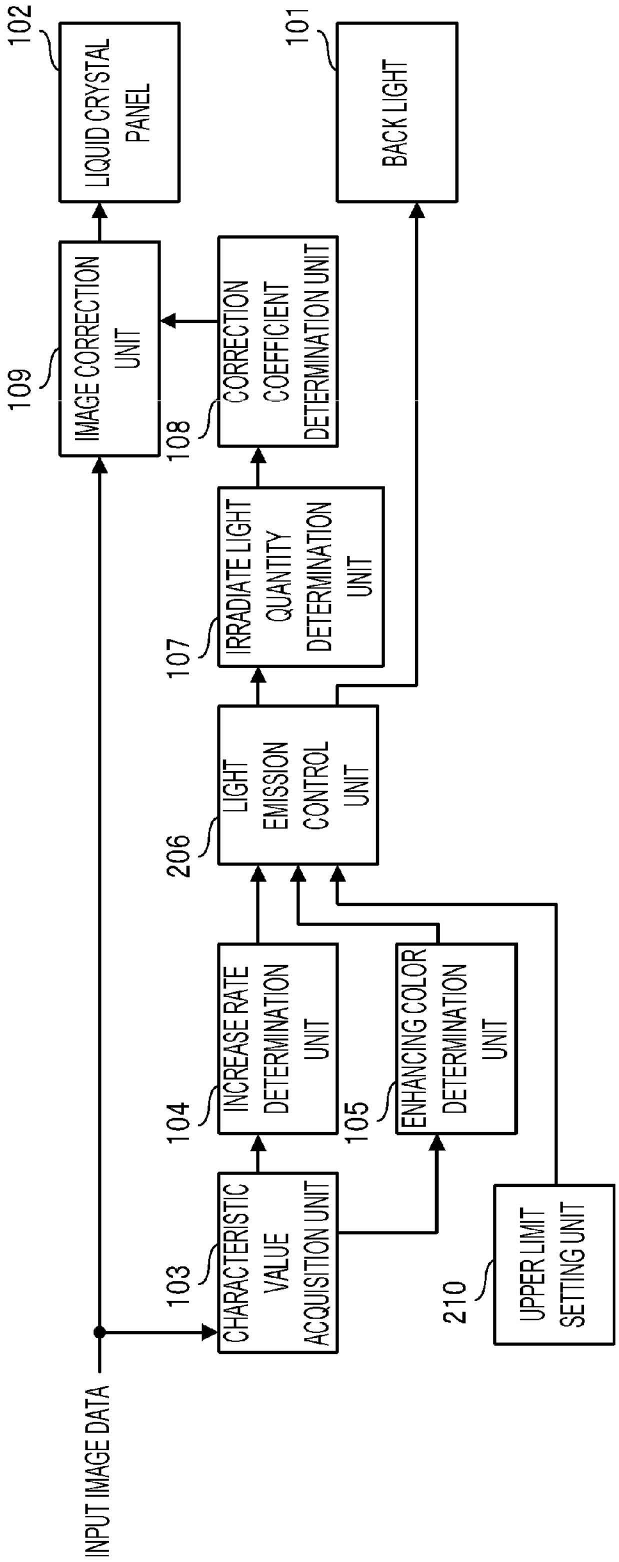
FIG. 8 is a block diagram depicting an example of a functional configuration of a di splay apparatus according to Example 2.

FIG. 8 is a block diagram depicting an example of a functional configuration of the display apparatus according to Example 2.

The display apparatus according to this example includes a backlight 101, a liquid crystal panel 102, a characteristic value acquisition unit 103, an increase rate determination unit 104, an enhancing color determination unit 105, a light emittion control unit 206, an irradiated light quantity determination unit 107, a correction coefficient determination unit 108, an image correction unit 109 and an upper limit setting unit 210.

The operation of the backlight 101, the liquid crystal panel 102, the characteristic value acquisition unit 103, the increase rate determination unit 104, the enhancing color determination unit 105, the irradiated light quantity determination unit 107, the correction coefficient determination unit 108, and the image correction unit 109 is the same as Example 1.

The upper limit setting unit 210 sets the operation mode of the image process. The operation mode indicates the lower limit value of the gradation number of the image data. Therefore the upper limit setting unit 210 sets the lower limit value of the gradation number of the image data (gradation number setting process).

The upper limit setting unit 210 sets a smaller value for the upper limit value of the increase rate as the lower limit value of the gradation number that is set is greater. Thereby the increase rate, at which the gradation number of the image data after image process becomes a value not less than the lower limit value, can be set for the upper limit value of the increase rate. The upper limit setting unit 210 outputs the upper limit value of the increase rate that is set to the light emission control unit 206.

In this example, the upper limit setting unit 210 sets the upper limit value of the increase rate based on the relationship between the increase rate and the resolution shown in FIG. 7. For example, if an operation mode to indicate a 10-bit resolution is set, 4 is set for the upper limit value of the increase rate.

The process to set the lower limit value of the gradation number and the process to set the upper limit value of the increase rate may be performed by different functional units. For example, the display apparatus may have a lower limit value setting unit that sets the lower limit value of the gradation number, and an upper limit value setting unit that sets the upper limit value of the increase rate.

The light emission control unit 206 has a function similar to the light emission control unit 106 of Example 1. The light emission control unit 206 however limits the corrected increase rate to a value that is not greater than the upper limit value of the increase rate which is set by the upper limit setting unit 210 (second limiting process). Then just like Example 1, the light emission control unit 206 controls the emission brightness to be a value generated by correcting a predetermined reference value at the increase rate after the limiting the increase rate.

Both the second limiting process and the first limiting process described in Example 1 may be performed, or either one of these processes may be performed.

As described above, according to this example, the upper limit value of the increase rate is controlled based on the lower limit value of the gradation number, hence the color gamut of the display image can be expanded while controlling the gradation not to be under the lower limit value.

In this example, the upper limit value of the increase rate is controlled based on the operation mode of the image process, but the method for controlling the upper limit value of the increase rate is not limited to this. For example, the upper limit value of the increase rate may be set based on the operation mode that indicates the upper limit value of the power consumption. Thereby both the degree of expansion of the color gamut and the power consumption of the display apparatus can be controlled. In concrete terms, the color gamut of the display image can be expanded while controlling the power consumption not to exceed the upper limit value.

Example 3

A display apparatus and a control method thereof according to Example 3 of the present invention will now be described.

In Examples 1 and 2, a case of expanding the color gamut of the display image while maintaining the brightness of the input image was described. However an image data, where brightness gradation in the high brightness region is compressed, may be inputted as the input image data. For example, image data, where knee correction has been performed to reduce whitening, may be inputted as the input image data. If the brightness gradation in the high brightness region is compressed, the brightness in the high brightness region decreases. In Example 3, a case of restoring the brightness gradation before compression while expanding the color gamut of the display image without generating whitening will be described.

The functional configuration of the display apparatus according to Example 3 is the same as Embodiment 1 (FIG. 1). In Example 3 however, the operation of the image correction unit 109 is different from Example 1. The operation of the functional units other than the image correction unit 109 is the same as Example 1.

Just like Example 1, the image correction unit 109 according to Example 3 performs process to expand the color gamut of the display image. The image correction unit 109 according to Example 3 further performs process to increase the brightness value in the high brightness region of the input image data.

Figure 9:
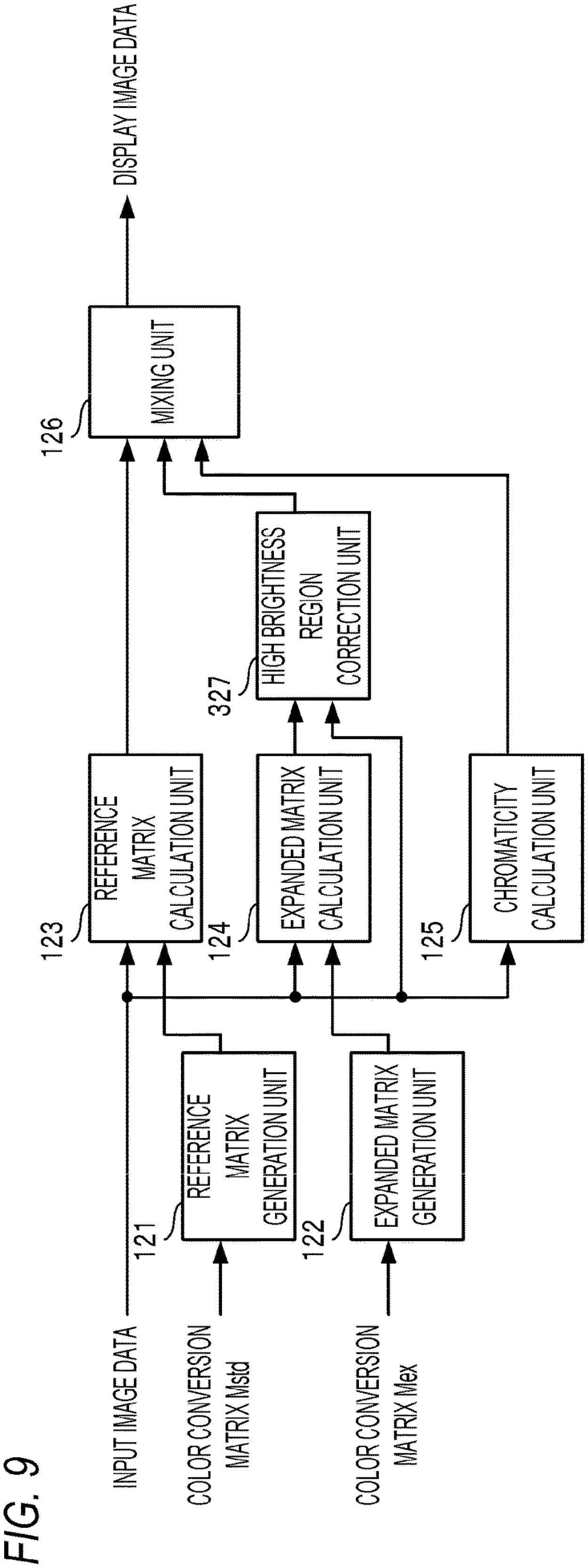
FIG. 9 is a block diagram depicting an example of a functional configuration of an image correction unit 109 according to Example 3.

FIG. 9 shows an example of a functional configuration of the image correction unit 109 according to Example 3.

The image correction unit 109 according to this example includes a reference matrix generation unit 121, an expanded matrix generation unit 122, a reference matrix calculation unit 123, an expanded matrix calculation unit 124, a chromaticity calculation unit 125, a mixing unit 126, and a high brightness region correction unit 327.

The operation of the reference matrix generation unit 121, the expanded matrix generation unit 122, the reference matrix calculation unit 123, the expanded matrix calculation unit 124, the chromaticity calculation unit 125 and the mixing unit 126 is the same as Example 1 (FIG. 4).

A high brightness region correction unit 327 increases a brightness value of an expanded conversion image data, so as to increase a brightness value of a high brightness region of the input image data. Then the high brightness region correction unit 327 outputs the expanded conversion image data, of which brightness value has been increased, to the mixing unit 126. In the high brightness region correction unit 327, the sub-pixel values of expanded conversion image data are corrected based on the sub-pixel value (R value, G value or B value) of the input image data.

Figure 10:
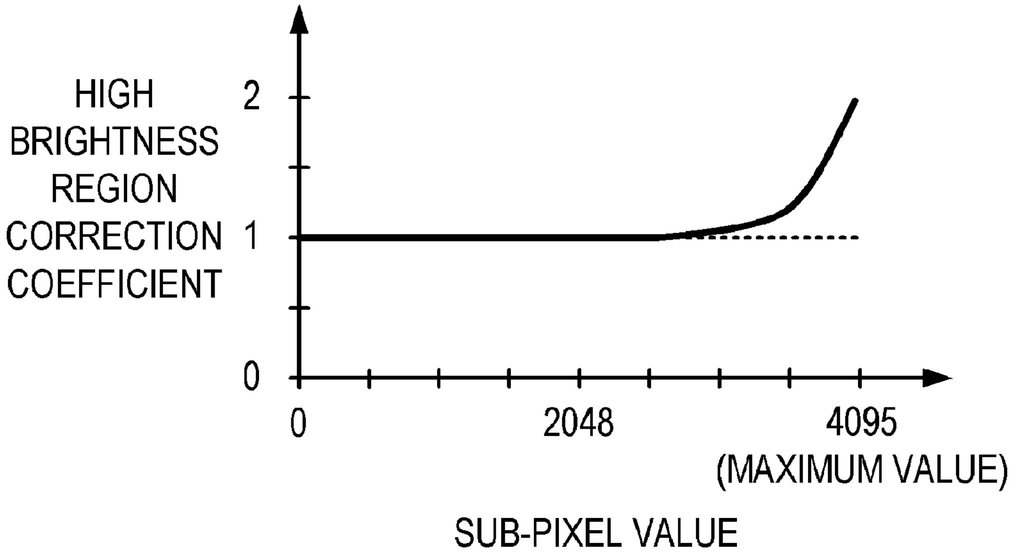
FIG. 10 is a graph depicting an example of a relationship between a sub-pixel value and a correction coefficient according to Example 3.

FIG. 10 shows an example of the relationship between the sub-pixel value and a high brightness region correction coefficient. In the example in FIG. 10, the high brightness region correction coefficient is greater than 1 in a region where the sub-pixel value is high (high brightness region). Further, in the high brightness region, a greater high brightness region correction coefficient is indicated as the sub-pixel value is greater. In regions other than the high brightness region, 1 is indicated as the high brightness region correction coefficient. The high brightness region correction unit 327 determines, for each sub-pixel, the high brightness region correction coefficient corresponding to the sub-pixel value of the input image data according to the relationship indicated in FIG. 10. Then for each sub-pixel, the high brightness region correction unit 327 multiplies the sub-pixel value of the expanded conversion image data outputted from the expanded matrix calculation unit 124 by the determined high brightness region correction coefficient. Thereby the brightness value of the expanded conversion image data is increased such that the brightness value of the high brightness region of the input image data is increased.

It is preferable that the relationship in FIG. 10 has been determined based on the image process (e.g. knee process) performed on the input image data.

The mixing unit 126 performs process similar to Example 1. However instead of the expanded conversion image data outputted from the expanded matrix calculation unit 124, the expanded conversion image data outputted from the high brightness region correction unit 327 (expanded conversion image data in which the brightness value has been increased) is used.

As described above, according to this example, the brightness value of the high brightness region of the input image data is increased, whereby brightness gradation before compressing the input image data can be restored without generating whitening. Furthermore, the color gamut of the display image can be expanded, just like Examples 1 and 2.

In this example, the example of increasing the brightness value of the input image data by increasing the brightness value of the expanded conversion image data was described, but the present invention is not limited to this. The brightness value of the reference conversion image data may be increased, or both the brightness value of the expanded conversion image data and the brightness value of the reference conversion image data may be increased. The brightness of the input image data may be increased before the input image data is inputted to the reference matrix calculation unit 123 and the expanded matrix calculation unit 124. The brightness value of the combined image data outputted from the mixing unit 126 may be increased.

Other Embodiments

Embodiment (s) of the present invention can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-034213, filed on Feb. 25, 2014, and Japanese Patent Application No. 2015-000654, filed on Jan. 6, 2015, which are hereby incorporated by reference herein in their entirety.

What is claimed is:

1. A display apparatus, comprising:

a light-emitting unit that includes a plurality of light-emitting devices of which emission colors are different from one another;

a display unit configured to display an image on a screen by modulating light from the light-emitting unit based on image data;

a first determination unit configured to determine, in a region of the screen, whether a ratio of a total number of first type pixels of which chroma level is less than a first chroma level, with respect to a total number of pixels in the region, is equal to or more than a first ratio;

a second determination unit configured to determine, in the region, whether a ratio of a total number of second type pixels of which chroma level is equal to or more than a second chroma level, with respect to the total number of pixels in the region, is equal to or more than a second ratio; and a control unit configured to increase emission brightness of a target device, which is a light-emitting device having an emission color corresponding to the second type pixel for which the determination result of the second determination unit is affirmative in a case where the determination results of the first determination unit and the second determination unit are affirmative.

2. The display apparatus according to claim 1, further comprising:

a determination unit configured to determine an increase rate of emission brightness of each of the plurality of light-emitting devices based on the image data; and a correction unit configured to correct an increase rate of the emission brightness of the target device to a greater value in a case where the number of the second type pixels of which chroma level for the emission color of the target device is equal to or more than the second chroma level is greater than a predetermined number, wherein the control unit controls the emission brightness of the target device to be a value generated by correcting a predetermined reference value with the increase rate after the correction by the correction unit.

3. The display apparatus according to claim 2, further comprising:

a limiting unit configured to limit the increase rate after correction by the correction unit so that the emission brightness of the target device does not exceed an upper limit value, wherein the control unit controls the emission brightness of the target device to be a value generated by correcting the predetermined reference value with the increase rate after limiting the increase rate by the limiting unit.

4. The display apparatus according to claim 3, further comprising:

a setting unit configured to set an upper limit value of the increase rate determined by the determination unit, wherein the limiting unit limits the increase rate after the correction by the correction unit to a value not greater than B1/B2 where B1 denotes an upper limit value of the emission brightness, and B2 denotes a value generated by correcting the predetermined reference value with the upper limit value that is set by the setting unit.

5. The display apparatus according to claim 4, further comprising:

a gradation number setting unit configured to set a lower limit value of a gradation number of the image data, wherein the setting unit sets, as the upper limit value of the increase rate, a value that is smaller as the lower limit value set by the gradation number setting unit is greater.

6. The display apparatus according to claim 1, further comprising:

an image correction unit configured to correct the image data according to emission brightness of each of the plurality of light-emitting devices, wherein the display unit modulates the light from the light-emitting unit based on the image data after the correction by the image correction unit.

7. The display apparatus according to claim 6, wherein the color of the light emitted from the light-emitting unit is changed by increasing the emission brightness of the target device, and the image correction unit corrects the image data so that a color gamut of the image displayed on the screen is expanded in a direction where the color of the light emitted from the light-emitting unit changes.

8. The display apparatus according to claim 6, wherein the image data is image data in which a brightness gradation of a high brightness region is compressed, and the image correction unit increases a brightness value of the high brightness region of the image data.

9. The display apparatus according to claim 1, wherein the light-emitting unit is provided in plurality, for each of the light-emitting units, the first determination unit determines, in a region corresponding to the light-emitting unit, whether a ratio of a total number of first type pixels with respect to a total number of pixels in the region, is equal to or more than the first ratio, and the second determination unit determines, in a region corresponding to the light-emitting unit for which the determination result of the first determination unit is affirmative, whether a ratio of a total number of second type pixels with respect to a total number of pixels in the region, is equal to or more than the second ratio.

10. The display apparatus according to claim 1, wherein the second determination unit performs determination for each of the emission colors corresponding to the plurality of light-emitting devices, using a pixel of which chroma level for the emission color is equal to or more than the second chroma level, as the second type pixel, and the control unit increases emission brightness of the light-emitting device having the emission color for which the determination result of the second determination unit is affirmative.

11. The display apparatus according to claim 1, wherein the first type pixel is a pixel for which the difference between the emission color of each of the plurality of light-emitting devices and a color of the pixel is a first threshold or greater, and the second type pixel is a pixel for which the difference between the emission color of any of the plurality of light-emitting devices and a color of the pixel is a second threshold or less.

12. A method for controlling a display apparatus which has:

a light-emitting unit that includes a plurality of light-emitting devices of which emission colors are different from one another; and a display unit configured to display an image on a screen by modulating light from the light-emitting unit based on image data, the method comprising:

a first determination step of determining, in a region of the screen, whether a ratio of a total number of first type pixels of which chroma level is less than a first chroma level, with respect to a total number of pixels in the region, is equal to or more than a first ratio;

a second determination step of determining, in the region, whether a ratio of a total number of second type pixels of which chroma level is equal to or more than a second chroma level, with respect to the total number of pixels in the region, is equal to or more than a second ratio; and a control step of increasing emission brightness of a target device, which is a light-emitting device having an emission color corresponding to the second type pixel for which the determination result in the second determination step is affirmative in a case where the determination results in the first determination step and the second determination step are affirmative.

13. A display apparatus, comprising:

a light-emitting unit that includes a plurality of light-emitting devices of which emission colors are different from one another;

a display unit configured to display an image on a screen by modulating light from the light-emitting unit based on image data;

a determination unit configured to determine emission brightness of each of the plurality of light-emitting devices based on the image data; and an emission brightness correction unit configured to perform a correction in which, in a predetermined region of the screen, a target device, which is a light-emitting device of which the emission brightness to be increased in the plurality of light-emitting devices, is determined based on a number of first type pixels of which chroma level is less than a first chroma level and a number of second type pixels of which chroma level is equal to or more than a second chroma level, and the emission brightness determined by the determination unit for the target device is increased based on the number of second type pixels of which chroma level for the emission color of the target device is equal to or more than the second chroma level.

14. The display apparatus according to claim 13, wherein the emission brightness correction unit corrects the emission brightness determined by the determination unit for the target device to a greater value in a case where the number of the second type pixels of which chroma level for the emission color of the target device is equal to or more than the second chroma level is greater than a predetermined number.

15. The display apparatus according to claim 13, further comprising:

a limiting unit configured to limit the emission brightness after correction by the emission brightness correction unit so that the emission brightness of the target device does not exceed an upper limit value.

16. The display apparatus according to claim 13, wherein the light-emitting unit is provided in plurality, for each of the light-emitting units, the determination unit determines emission brightness of each of the plurality of light-emitting devices of the light-emitting unit based on image data to be displayed in a correspondence region corresponding to the light-emitting unit, and for each of the light-emitting units, the emission brightness correction unit performs the correction in which, in the correspondence region corresponding to the light-emitting unit, the emission brightness determined by the determination unit for the target device, which is at least one of the plurality of light-emitting device of the light-emitting unit, is increased based on the number of first type pixels of which chroma level is less than the first chroma level and the number of second type pixels of which chroma level is equal to or more than the second chroma level.

17. A method for controlling a display apparatus which has:

a light-emitting unit that includes a plurality of light-emitting devices of which emission colors are different from one another; and a display unit configured to display an image on a screen by modulating light from the light-emitting unit based on image data, the method comprising:

a determination step of determining emission brightness of each of the plurality of light-emitting devices based on the image data; and an emission brightness correction step of performing a correction in which, in a predetermined region of the screen, a target device, which is a light-emitting device of which the emission brightness to be increased in the plurality of light-emitting devices, is determined based on a number of first type pixels of which chroma level is less than a first chroma level and a number of second type pixels of which chroma level is equal to or more than a second chroma level, and the emission brightness determined in the determination step for the target device is increased based on the number of second type pixels of which chroma level for the emission color of the target device is equal to or more than the second chroma level.

* * * * *